No. 717,296. Patented Dec. 30, 1902.
F. SPALDING.
MICROMETER CALIPERS.
(Application filed Feb. 6, 1902.)
(No Model.)

WITNESSES:
Chas. H. Luther Jr.
B. S. Webster

INVENTOR:
Frank Spalding
by Joseph H. Miller & Co.
ATTORNEYS.

UNITED STATES PATENT OFFICE.

FRANK SPALDING, OF PROVIDENCE, RHODE ISLAND, ASSIGNOR TO BROWN & SHARPE MANUFACTURING COMPANY, OF PROVIDENCE, RHODE ISLAND.

MICROMETER-CALIPERS.

SPECIFICATION forming part of Letters Patent No. 717,296, dated December 30, 1902.

Application filed February 6, 1902. Serial No. 92,882. (No model.)

*To all whom it may concern:*

Be it known that I, FRANK SPALDING, a citizen of the United States, residing at Providence, in the county of Providence and State of Rhode Island, have invented a new and useful Improvement in Micrometer-Calipers, of which the following is a specification.

This invention has reference to an improved device for clamping the spindle of a micrometer caliper or gage.

Micrometer calipers or gages consist usually of a frame having an anvil at one end and a spindle partly screw-threaded and in screw-thread engagement with the opposite end. These calipers or gages are used in the arts for the accurate measurement of parts and are usually constructed to determine microscopic differences within one one-thousandth of an inch. When the accurate measurement has been taken by a micrometer caliper or gage, it is desirable to lock the spindle, so as to retain the exact position of the same. To lock the spindle and maintain the same in the position when the measurement is taken, it is important that the spindle should not be rotated or moved longitudinally in the slightest degree, so that the measurement taken will not be altered.

The invention consists in the peculiar and novel construction of a split-spring clamping-ring and means for actuating the same, as will be more fully set forth hereinafter.

Figure 1:
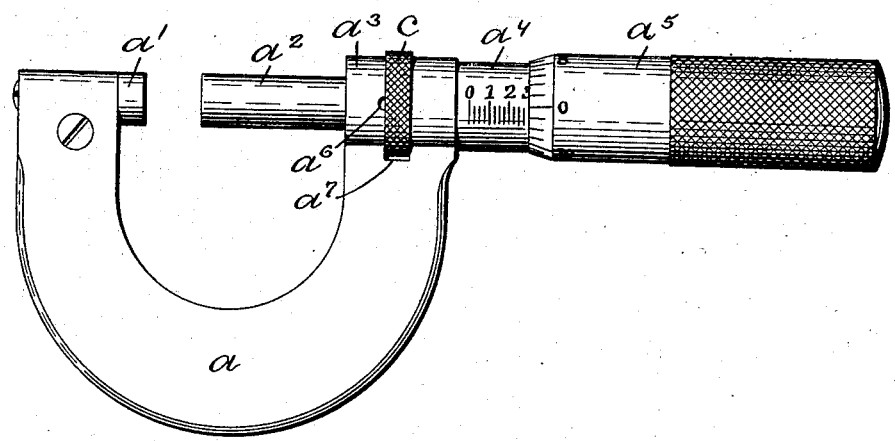
Figure 2:
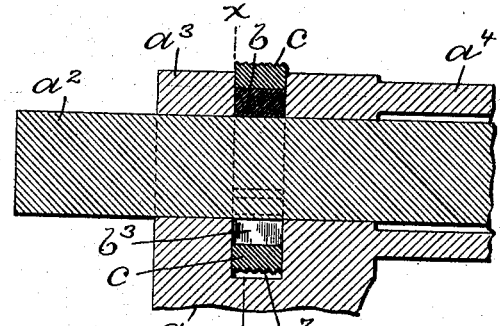
Figure 3:
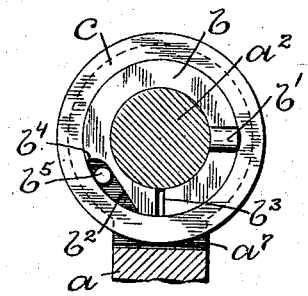
Figure 4:
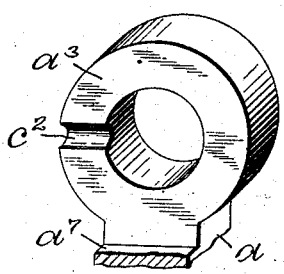
Figure 5:
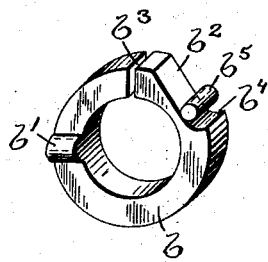
Figure 6:
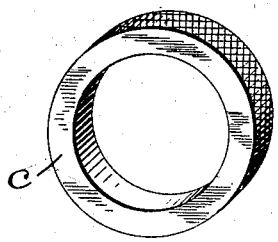

Figure 1 is a side view of a micrometer-caliper, showing my improvement. Fig. 2 is a sectional view of the part of the frame of the caliper in which the spindle is supported and the clamping device locked. Fig. 3 is a transverse sectional view of the frame on the line X X of Fig. 2, showing the clamping-ring and the means for operating the same. Fig. 4 is a perspective view of the part of the frame in which the spindle is supported and with which the split ring is connected. Fig. 5 is a perspective view of the split clamping-ring, showing the member interposed between the split ring and the actuating-ring. Fig. 6 is a perspective view of the actuating-ring.

In the drawings, $a$ indicates the frame of the micrometer-caliper; $a'$ the anvil, $a^2$ the spindle, $a^3$ the bearing for the spindle, $a^4$ the barrel, and $a^5$ the sleeve, of a micrometer-caliper in which the spindle $a^2$ is usually in screw-thread engagement with the end of the barrel $a^4$, and the sleeve $a^5$ is connected with the spindle, so as turn with the same, the sleeve extending over the barrel. The side of the barrel is usually graduated, and the beveled end of the sleeve is also graduated, as is shown in Fig. 1.

The split ring $b$ is provided with the preferably semicylindrical projection $b'$. The tangential plane surface $b^2$ extends from the peripheral edge of the ring near the split $b^3$ to the shoulder $b^4$, forming a wedge-shaped seat in which the member $b^5$, preferably a roller, may be inserted when the split ring $b$ is placed into the actuating-ring $c$, the peripheral surface of which is preferably milled. The split ring $b$ when in the normal expanded condition fits the spindle $a^2$ with a sliding fit and also fits into the actuating-ring $c$ with a sliding fit. The split ring $b$ and the actuating-ring $c$ are preferably of the same thickness.

In connecting the clamping device to the caliper I prefer to drill a hole $a^6$ through the wall of the bearing $a^3$ of the spindle and then cut a slot $a^7$ of a width equal to the thickness of the actuating-ring $c$ through the portion of the frame forming the bearing $a^3$ for the spindle, one side of which slot is on a line with the center of the hole $a^6$. When the slot $a^7$ is cut, the remaining portion of the hole $a^6$ forms the concave seat $c^2$. (Shown in Fig. 4.) The split ring $b$ may now be placed into the actuating-ring $c$, the member $b^5$ in the wedge-shaped cavity between the split ring and the actuating-ring, as is shown in Fig. 3, and the assembled parts may be slid into the slot $a^7$, with the projection $b'$ in the seat $c^2$. The spindle is now placed in position, extending through the split ring, which ring is held against rotation.

I do not wish to confine myself to the exact construction of the parts, as these may be modified without materially effecting the operation of the device.

A micrometer-caliper provided with my improved locking or spindle-clamping device may when the spindle has been adjusted in taking a measurement be locked securely without the possibility of disturbing the adjustment of the spindle by rotating the actuating-ring $c$, and thereby moving the member $b^5$ on the plane $b^2$ toward the split $b^3$ to contract the ring and clamp it onto the spindle $a^2$. The spindle may be released by the reverse movement of the actuating-ring $c$.

Having thus described my invention, I claim as new and desire to secure by Letters Patent—

1. The combination with the spindle of a micrometer-caliper, the bearing of the spindle, a transverse slot in the bearing and a cavity in the wall of the bearing, of a split ring, a projection on the split ring, a tangential plane on the split ring, an actuating-ring inclosing the split ring, and a member operated by the actuating-ring and operating the split ring, as described.

2. In a micrometer-caliper, the combination with the frame of the caliper, the anvil, the spindle, the bearing for the spindle, and the micrometer mechanism, of the slot $a^7$, the seat $c^2$ in the wall of one side of the slot, the split ring $b$, the projection $b'$ on one face of the split ring, the plane $b^2$ and shoulder $b^4$ on the split ring, the member $b^5$, and the actuating-ring $c'$, as described.

In testimony whereof I have signed my name to this specification in the presence of two subscribing witnesses.

FRANK SPALDING.

Witnesses:
JOSEPH A. MILLER,
B. S. WEBSTER.